United States Patent
Shah et al.

(10) Patent No.: US 8,300,789 B2
(45) Date of Patent: Oct. 30, 2012

(54) METHOD AND SYSTEM FOR IDENTIFYING A MULTIPOINT CONTROL UNIT FOR HOSTING A CONFERENCE

(75) Inventors: Krutarth M. Shah, Fremont, CA (US); Rajah K. V. R. Kalipatnapu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1416 days.

(21) Appl. No.: 11/796,993

(22) Filed: Apr. 30, 2007

(65) Prior Publication Data

US 2008/0266383 A1 Oct. 30, 2008

(51) Int. Cl.
*H04M 3/42* (2006.01)

(52) U.S. Cl. ............. 379/202.01; 348/14.08; 348/14.09; 370/260; 709/201; 709/218; 709/226

(58) Field of Classification Search .......... 370/259–271, 370/351–356; 348/14.01–14.16; 709/201–207, 709/217–248
See application file for complete search history.

(56) References Cited

U.S. PATENT DOCUMENTS

| | | | |
|---|---|---|---|
| 4,494,144 A | 1/1985 | Brown ........................ 348/420.1 |
| 5,270,919 A | 12/1993 | Blake et al. |
| 5,673,256 A * | 9/1997 | Maine ........................... 370/271 |
| 5,801,756 A | 9/1998 | Iizawa ....................... 348/14.11 |
| 6,014,700 A * | 1/2000 | Bainbridge et al. .......... 709/226 |
| 6,182,110 B1 | 1/2001 | Barroux |
| 6,606,643 B1 * | 8/2003 | Emens et al. ................. 709/203 |
| 6,611,503 B1 | 8/2003 | Fitzgerald et al. ............ 370/260 |
| 6,711,212 B1 | 3/2004 | Lin .......................... 375/240.24 |
| 6,757,277 B1 | 6/2004 | Shaffer et al. ................. 370/356 |
| 6,775,247 B1 | 8/2004 | Shaffer et al. ................. 370/260 |
| 6,990,521 B1 | 1/2006 | Ross |
| 6,999,829 B2 | 2/2006 | Bazzocchi et al. ............. 700/99 |
| 7,054,933 B2 * | 5/2006 | Baxley et al. ................. 709/226 |
| 7,080,105 B2 | 7/2006 | Nakanishi et al. ............ 707/204 |
| 7,085,786 B2 | 8/2006 | Carlson et al. ............... 707/204 |
| 7,103,664 B1 * | 9/2006 | Novaes et al. ................ 709/226 |
| 7,184,531 B2 * | 2/2007 | Crouch .................... 379/202.01 |
| 7,213,050 B1 * | 5/2007 | Shaffer et ..................... 709/204 |

(Continued)

FOREIGN PATENT DOCUMENTS

EP 1 517 506 A2 9/2004

(Continued)

OTHER PUBLICATIONS

Shah, et al., "System and Method for Optimizing Maintenance of Geographically Distributed Processing Units"; U.S. Appl. No. 11/465,740, filed Aug. 18, 2006.

(Continued)

*Primary Examiner* — Hemant Patel
(74) *Attorney, Agent, or Firm* — Baker Botts L.L.P.

(57) ABSTRACT

A method for identifying a multipoint control unit (MCU) for hosting a conference includes receiving a notification indicating one or more conference parameters and ranking a plurality of MCUs wherein the ranking is based on one or more, network conditions. The method includes selecting a first MCU based on a rank associated with the first MCU and determining whether the first MCU is capable of hosting the conference. In response to determining that the first MCU is capable of hosting the conference, the method includes assigning the conference to be hosted by the first MCU.

31 Claims, 3 Drawing Sheets

U.S. PATENT DOCUMENTS

| | | | |
|---|---|---|---|
| 2001/0002927 A1* | 6/2001 | Detampel et al. | 379/202 |
| 2002/0078153 A1 | 6/2002 | Chung et al. | |
| 2002/0099682 A1 | 7/2002 | Stanton | 707/1 |
| 2002/0165754 A1 | 11/2002 | Tang et al. | |
| 2003/0023672 A1* | 1/2003 | Vaysman | 709/203 |
| 2004/0015409 A1 | 1/2004 | Chittenden et al. | |
| 2006/0026212 A1 | 2/2006 | Tsukerman et al. | |
| 2006/0041571 A1 | 2/2006 | Kubokawa | 707/101 |
| 2006/0129626 A1* | 6/2006 | Fitzpatrick et al. | 709/200 |
| 2006/0171337 A1 | 8/2006 | Shaffer et al. | |
| 2006/0233120 A1* | 10/2006 | Eshel et al. | 370/260 |
| 2007/0083521 A1* | 4/2007 | Diedrich et al. | 707/10 |
| 2007/0250620 A1 | 10/2007 | Shah et al. | |
| 2007/0299954 A1* | 12/2007 | Fatula | 709/223 |
| 2008/0267282 A1 | 10/2008 | Kalipatnapu et al. | 375/240 |

FOREIGN PATENT DOCUMENTS

| | | |
|---|---|---|
| WO | WO 02/76030 A1 | 3/2002 |
| WO | WO 02/060126 A1 | 8/2002 |
| WO | WO 2004/109975 A1 | 4/2004 |

OTHER PUBLICATIONS

Communication from European Patent Office Application No. 08 746 994.6-1244, 8 pages, dated Jun. 21, 2010 but not received until Jul. 15, 2010.

PCT Notification of Transmittal of the International Search Report and the Written Opinion of the International Searching Authority, or the Declaration, PCT/US2008/061714, dated Oct. 17, 2008, 11 pages.

USPTO Office Action for U.S. Appl. No. 11/741,088, filed Apr. 27, 2007, Kalipatnapu, et al., Office Action dated Jul. 11, 2011, 14 pages.

Response to Office Action dated Oct. 4, 2011 for U.S. Appl. No. 11/741,088 to Kalipatnapu, et al. 17 pages.

PCT Notification of Transmittal of the International Search Report and the Written Opinion of the ISA, or the Declaration for PCT/US2008/061120; ISA/EP; 9 pages, Aug. 22, 2008.

USPTO Office Action for U.S. Appl. No. 11/741,088, filed Apr. 27, 2007, Kalipatnapu, et al., Final Office Action dated Dec. 7, 2011.

State Intellectual Property Office of the People's Republic of China, The First Office Action, re Appln. 2008/80014055, Serial No. 2011/120600718730, dated Dec. 9, 2011, and forwarded to Applicant on Mar. 22, 2012.

Notification of Transmittal of the International Search Report and the Written Opinion of the International Searching Authority, or the Declaration for PCT/US07/70563 (ISA/US); 6 pages dated Feb. 4, 2008.

State Intellectual Property Office of the People's Republic of China, the First Office Action, re Appln. 2008/80013465.3, Serial No. 2011/121200385930, dated Dec. 15, 2011, and forwarded to Applicant on Apr. 19, 2012.

EP Search Report for Application No. 07798195.9-2221 dated Mar. 21, 2012, forwarded to Application on Apr. 19, 2012 (6 pages).

Shah et al., U.S. Appl. No. 11/465,740, Office Action dated Feb. 25, 2009.

Shah et al., U.S. Appl. No. 11/465,740, Response to Office Action mailed May 26, 2009.

Shah et al., U.S. Appl. No. 11/465,740, Notice of Non-Compliant Amendment dated Sep. 2, 2009.

Shah et al., U.S. Appl. No. 11/465,740, Response to Non-Compliant Amendment dated Oct. 2, 2009.

Shah et al., U.S. Appl. No. 11/465,740, Final Office Action dated Jan. 22, 2010.

Shah et al., U.S. Appl. No. 11/465,740, Notice of Appeal and Pre-Appeal Brief mailed Apr. 22, 2010.

Shah et al., U.S. Appl. No. 11/465,740, Appeal Brief dated Jul. 21, 2010.

Shah et al., U.S. Appl. No. 11/465,740, Examiner's Answer dated Aug. 20, 2010.

Shah et al., U.S. Appl. No. 11/465,740, Reply Brief dated Oct. 20, 2010.

* cited by examiner

METHOD AND SYSTEM FOR IDENTIFYING A MULTIPOINT CONTROL UNIT FOR HOSTING A CONFERENCE

TECHNICAL FIELD OF THE INVENTION

The invention relates generally to communication systems and more particularly to a method and system for identifying a multipoint control unit for hosting a conference.

BACKGROUND OF THE INVENTION

There are many methods available which allow groups of individuals located throughout the world to engage in conferences. Such methods generally involve transmitting information and other data from communication equipment located at one conference site to communication equipment located at one or more other locations. A multipoint control unit (MCU) (sometimes referred to as a multipoint conference unit) may be used to couple communication equipment used at the various conference sites, thereby allowing users from distributed geographic locations to participate in a teleconference. While a MCU may connect users at multiple conference sites, the transmission of conference data to and from a MCU may cause delays, pauses, or other breaks in communications between participants which may detract from the overall conferencing experience for the participants.

SUMMARY OF THE DISCLOSURE

The present invention provides a method and system for identifying a multipoint control unit (MCU) for hosting a conference that substantially eliminates or greatly reduces at least some of the disadvantages and problems associated with previous methods and systems.

In accordance with a particular embodiment, a method for identifying a multipoint control unit (MCU) for hosting a conference includes receiving a notification indicating one or more conference parameters and ranking a plurality of MCUs the ranking based on one or more network conditions. The method includes selecting a first MCU based on a rank associated with the first MCU and determining whether the first MCU is capable of hosting the conference based on the conference parameters. In response to determining that the first MCU is capable of hosting the conference, the method includes assigning the conference to be hosted by the first MCU.

In a more particular embodiment, ranking the plurality of MCUs includes sending a test ping between one or more of a plurality of sites scheduled to participate in the conference and one or more of the plurality of MCUs and determining network latency based on a response to the test ping. The test ping may be initiated by one of the sites or one of the MCUs. The method may also include testing the network conditions prior to initiating the conference by sending a test ping between the first MCU and one or more of a plurality of sites scheduled to participate in the conference. The direction of the test ping may be from MCU to participating site or vice versa.

In certain embodiments the network conditions may include the location of each of a plurality of sites participating in the conference. The location of each site may be based on a time zone, latitude/longitude, country code/phone number prefix, or an identifying tag associated with the site. Alternatively, the location may be based on the location of a call manager associated with a site.

In another embodiment, the method includes determining that none of the plurality of MCUs is capable of hosting the conference. In response to making this determination the method may include prompting a user with a scheduling message indicating that one or more of the conference parameters needs to be changed.

Also provided is a system for identifying a MCU for hosting a conference which includes an interface and a processor. The interface may be operable to receive a notification indicating one or more conference parameters. The processor may be operable to rank a plurality of MCUs, the ranking based on one or more network conditions, select a first MCU based on a rank associated with the first MCU, and determine whether the first MCU is capable of hosting the conference based on the one or more conference parameters. In response to determining that the first MCU is capable of hosting the conference, the processor may assign the conference to be hosted by the first MCU.

Technical advantages of certain embodiments of the present invention include enabling the identification of an optimal MCU for hosting a multipoint conference. Selecting an optimal MCU to host a conference may limit the number of delays, pauses, or other breaks in communications between participants of the conference.

Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

To provide a more complete understanding of the present invention and the features and advantages thereof, reference is made to the following description, taken in conjunction with the accompanying drawings, in which.

DETAILED DESCRIPTION OF THE DISCLOSED EMBODIMENTS

Figure 1:
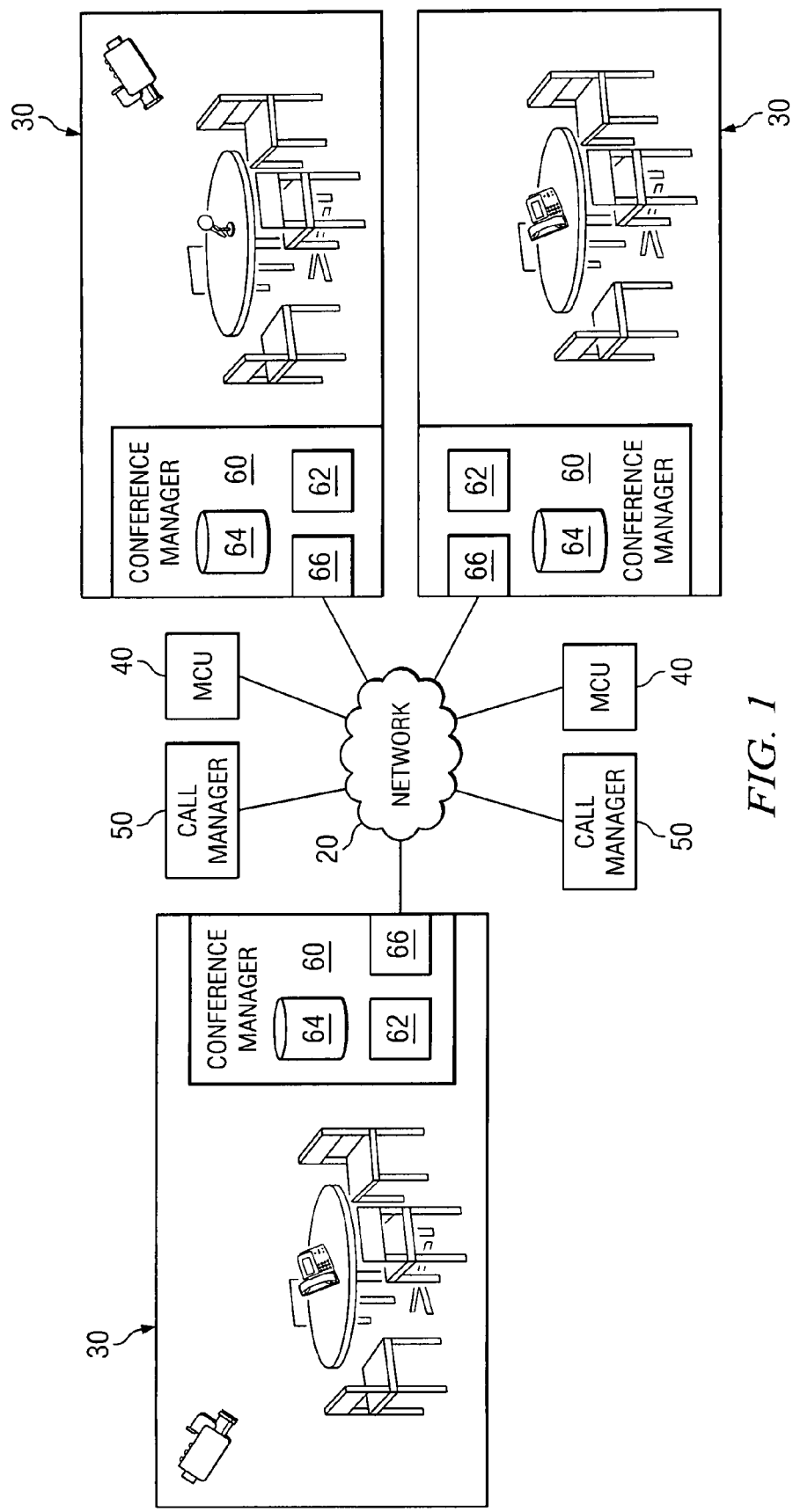
FIG. 1 is a simplified block diagram illustrating a communication system for identifying a multipoint control unit for hosting a conference, as well as a plurality of conference sites operable to communicate amongst each other in accordance with a particular embodiment.

FIG. 1 illustrates a communication system 10 for conferencing in accordance with a particular embodiment. As illustrated, communication system 10 includes a communication network 20, conference sites ("sites") 30, multipoint control units (MCUs) 40, and call managers 50. Additionally, each site 30 may include a conference manager (CM) 60 for facilitating a conference. There may be a single centralized conference manager (such as one per enterprise) or multiple conference managers that communicate with each other where each conference manager manages entities in a given geographic or logical location. As used herein, a "conference" may include any communication session between a plurality of users transmitted using any audio and/or video means, including signals, data or messages transmitted through voice and/or video devices, text chat, web session, and instant messaging.

In accordance with a particular embodiment, a CM 60 may select an optimal MCU to host a multipoint conference based on a variety of network conditions including, the location of a site, latency, and the availability of network resources such as bandwidth. Each site may be identified as a geographic location or logical space and more than one conference participant may exist at any given site. For latency calculations, consideration may be given to the participants as opposed to the site. For purposes of this specification, hosting a conference may include collecting and distributing data to and from conference sites participating in a conference. Because underlying network conditions may impact the quality, accuracy, and speed of data transferred during a conference, selecting an optimal MCU to host a conference may enhance the conferencing experience for participants.

As illustrated in FIG. 1, sites 30 are endpoints which may engage in a teleconference such as a videoconference. In general, sites 30 may include any suitable combination or collection of hardware and/or software which may facilitate any form of teleconference such as a videoconference or phone conference. More specifically, sites 30 may include any number of microphones, cameras, video cameras, speakers, user interfaces, monitors, computers, telephones, Internet protocol (IP) phones, speakerphones, or any other suitable conferencing device. In a particular embodiment, sites 30 may be dedicated conference enabled rooms and thus may contain any suitable dedicated conferencing equipment.

Communication network 20 represents communication equipment including hardware and any appropriate controlling logic for interconnecting elements coupled to communication network 20. In general, communication network 20 may be any network capable of transmitting audio and/or video telecommunication signals, data, and/or messages, including signals, data, or messages transmitted through text chat, instant messaging, and e-mail. Accordingly, communication network 20 may include all, or a portion of, a radio access network; a public switched telephone network (PSTN); a public or private data network; a local area network (LAN); a metropolitan area network (MAN); a wide area network (WAN); a local, regional, or global communication or computer network such as the Internet; a wireline or wireless network; an enterprise intranet; or any combination of the preceding. To facilitate its communication capabilities, communication network 20 may include routers, hubs, switches, gateways, call controllers, and/or any other suitable components in any suitable form or arrangement. Additionally, communication network 20 may represent any hardware and/or software configured to communicate information in the form of packets, cells, frames, segments or other portions of data. Although communication network 20 is illustrated as a single network, communication network 20 may include any number or configuration of networks. Moreover, communication system 10 may include any number or configuration of communication networks 20.

MCU 40 acts as an intermediary during a multipoint communication conference. In particular, MCU 40 may host a multipoint conference by collecting audio and/or video signals transmitted by conference participants through their sites and distribute such signals to other participants of the multipoint conference at remote sites 30. MCU 40 may also assign particular audio and/or video signals to particular monitors at a remote conference site. To support the described hosting capabilities, MCU 40 may include any bridging or switching device used in support of multipoint conferencing, including videoconferencing. In various embodiments, MCU 40 may include hardware, software and/or embedded logic. MCU 40 may be configured to support any number of conference sites communicating on any number of conferences, simultaneously. Additionally, MCU 40 may be in the form of customer provided equipment (CPE, e.g., beyond the network interface) or may be embedded in a network such as communication network 20.

Call managers 50 include any suitable combination of hardware and/or software operable to establish a connection between a calling component of communication system 10 and a called component. In particular, call managers 50 may initiate, connect, and maintain a communication session between communications devices located at a site 30 or anywhere within communication system 10. The session management functionality of call manager 50 provides the ability to control the attributes of an end-to-end call across multiple networks in communication system 10. For example, in particular embodiments, call mangers 50 may support session initiation protocol (SIP), which is a standard for multimedia conferencing over Internet protocol (IP). In such embodiments, call manager 50 may include a SIP proxy server that handles all call processing, SIP requests, and SIP responses.

Conference managers ("CM") 60 may communicate information and signals to and from communication network 20 and a site 30. CM 60 may also communicate information and signals to and from communication network 20 and a MCU 40. As illustrated in FIG. 1, CM 60 includes processor 62, memory 64, and interface 66. In a particular embodiment, CM 60 may also have a display or user interface to receive and present suitable information to a conference participant at a site 30. In addition, while each CM 60 is depicted as residing at a site 30, a CM 60 may be located anywhere within communication system 10. Also, one CM 60 may have responsibility for more than one site 30.

Processor 62 is operable to execute instructions associated with the functionality provided by CM 60. Processor 62 may represent any suitable device(s) capable of processing and/or communicating electronic information. Examples of processor 62 include, but are not limited to, application-specific integrated circuits (ASICs), field-programmable gate arrays (FGPAs), digital signal processors (DSPs), and any other suitable specific or general purpose processors.

Memory 64 may store processor instructions and/or any other appropriate information used by CM 60. Memory 64 may store information and data relating to a local site 30 as well as any other site 30. In particular, memory 64 may maintain a system directory which may include the location of each site 30, bandwidth and latency information for telecommunications lines/channels connecting sites 30, or any other information relating to network conditions. The directory may also store information regarding network components which may be involved in a conference such as the call managers 50 which service a particular site 30. Memory 64 may include any collection and arrangement of volatile or non-volatile, local or remote devices suitable for storing data. Examples of memory 64 include, but are not limited to, random access memory (RAM) devices, dynamic random access memory (DRAM), read only memory (ROM) devices, magnetic storage devices, optical storage devices, flash memory, or any other suitable data storage devices.

Interface 66 is capable of facilitating communication between CM 60 and communication network 20. Interface 66 may, in general, include any appropriate combination of software and/or hardware to support communication between CM 60 and appropriate components of communication network 20. In particular embodiments, interface 66 may include a Network Interface Card (NIC), and any appropriate controlling logic.

Modifications, additions, or omissions may be made to communication system 10. For example, communication system 10 may include any number or configuration of sites 30 and may facilitate conferencing between any suitable number of sites 30. As another example, communication system 10 may include any number or configuration of MCUs 40. Additionally, the operations of communication system 10 may be performed by more, fewer, or other components. Similarly, components of communication system 10 may be combined in any suitable manner and the operation may be performed using any suitable logic.

FIG. 1 illustrates the general interaction of the components of communication system 10 in selecting a MCU in accordance with a particular embodiment. At the outset, a conference organizer may schedule a conference using any conventional scheduling program such as Microsoft Outlook or Microsoft Exchange. Scheduling a conference may involve inviting participants, reserving conference rooms, and/or reserving network resources, such as ports, necessary to support the conference. Once the organizer invites the participants and/or sites 30, the scheduling program may notify a CM 60 that a conference has been scheduled and provide information regarding the participants and/or sites. In response, the CM 30 may determine an optimal MCU 40 for hosting the conference. Once a MCU 40 has been selected to host the conference, the CM 60 may notify each of the participating sites of any conference identifiers for joining the conference. Additionally, the CM 60 may also reserve the selected MCU as well as the resources needed to support the conference.

As mentioned, a host MCU may be selected based on a variety of network conditions including, but not limited to, the location of one or more sites scheduled to participate in a conference, network latency, and/or the availability of other network resources such as bandwidth. A particular issue with respect to communicating data in a network environment is latency. Communication latency may severely diminish the quality of a teleconference by causing delays, pauses, or other breaks in communications between participants. Thus, selecting a MCU with minimal latency with respect to communications between the MCU and sites participating in a conference may provide a better conferencing experience. While latency may be measured, it is a dynamic quality and therefore may be difficult to forecast with certainty. Accordingly, considering other network conditions such as the location of sites participating in a conference or available bandwidth may limit the uncertainty and effects of latency.

According to one embodiment, a MCU may be selected to host a conference based on the current latency between a MCU and the participating sites. Current latency may be measured by sending a test ping between a MCU and a participating site or a CM associated with a site participating in a conference. The test ping may be an Internet control message protocol (ICMP) echo request or any other suitable communication for measuring latency and/or packet loss. The test ping may be sent from each participating site to a particular MCU that was previously selected to host the conference. A query request between a MCU and a CM may be made in lieu of the test ping to collect certain statistics and achieve a decision similarly obtained through the test ping. In one embodiment, the test ping may be sent from each MCU in the network to every participating site. In another particular embodiment, the test ping may be sent from each participating site to every MCU in the network. By measuring the response rate as well as the time between when a test ping is transmitted and a response received, network latency and a packet loss rate may be calculated. Based on the results an optimal MCU, such as the MCU which has the least cumulative latency or packet loss rate between itself and each participating site, may be selected to host the conference.

In another embodiment, an optimal MCU may be selected based on historical network data. For instance, a CM and/or MCU may maintain and store records of network latency and packet loss in a directory. Such records may be generated from previous conferences or by periodically sending out test pings in the previously discussed manner. When a conference is scheduled, the network data may be analyzed to determine a MCU that, for example, on average has the least latency between itself and the participating sites at the time for which the conference is scheduled to occur. More specifically, the network data may be analyzed to estimate network conditions at the time that the conference is scheduled. Because network latency between participating sites and a particular MCU may vary according to factors such as the time of day, an optimal host MCU for a conference scheduled in the morning may not be the optimal MCU in the evening. Therefore, measuring network conditions such as packet loss rate and latency when initially scheduling a conference may not provide an accurate estimate of the network conditions when the conference actually occurs. Accordingly, selecting a host MCU based, in part, on historical network data may ensure that an optimal MCU is selected to host a conference.

Figure 2:
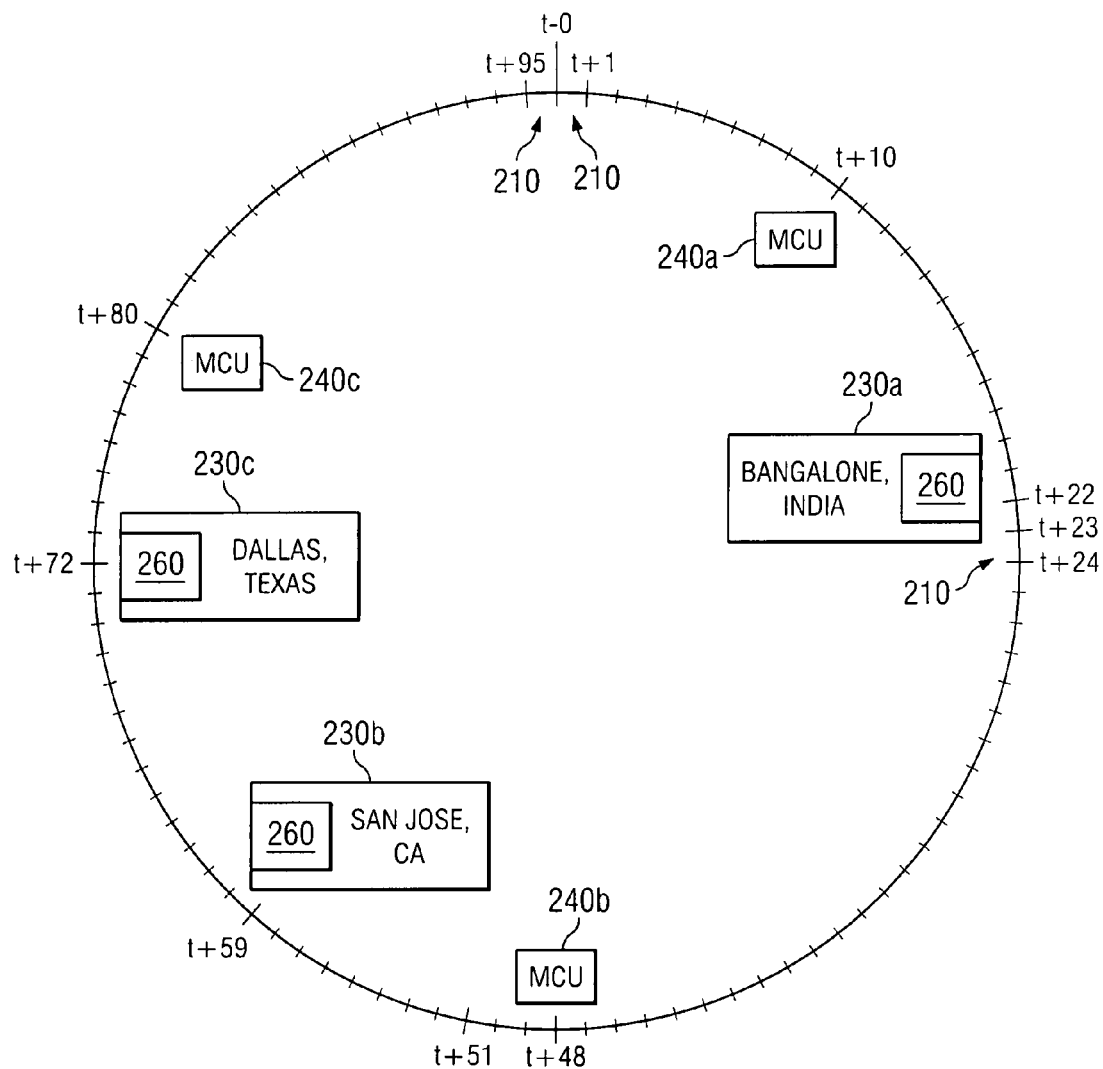
FIG. 2 is a simplified block diagram illustrating a plurality of conference sites situated in multiple time zones in accordance with a particular embodiment.
Figure 3:
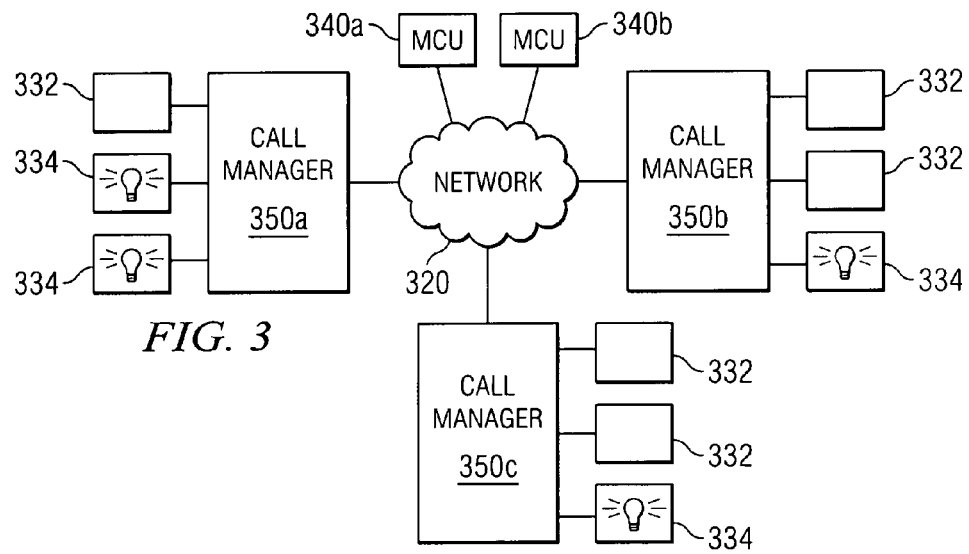
FIG. 3 is a simplified block diagram illustrating a plurality of conference sites serviced by multiple call managers in accordance with another embodiment.

FIG. 2 and FIG. 3 depict various embodiments wherein a MCU may be selected based on its location relative to sites participating in the conference. Selecting a centrally located MCU may enhance data transfer between sites by minimizing the cumulative distance conference data packets must travel to reach each site respectively. Accordingly, the effects of network latency may be reduced or minimized.

FIG. 2 illustrates a communication system 200 having multiple sites 230a-230c located in a plurality of time zones 210. A plurality of MCUs 240a-240c are also interspersed among the time zones 210. Each site 230 also has an associated CM 260. In particular embodiments, communication system 200 may include similar components and networks as described with respect to communication systems 10 of FIG. 1.

In the embodiment illustrated in FIG. 2, a CM 30 may select a host MCU based on the respective time zones 210 of each site engaged in the conference. As used herein, a time zone references a region of the earth which has adopted, or was assigned, the same standard time. While the typical twenty-four time zone standard may be implemented, the earth may be divided into any suitable number of time zones. The time at each site may be coordinated according to any suitable standard such as Greenwich Mean Time (GMT), Universal Time (UT), or Coordinated Universal Time (UTC). According to one embodiment, a central time zone positioned between participating sites may be determined using an algorithm which calculates the mean distance between participating sites. As an example, the central time zone may be determined by the equation:

$$\text{Central} = \frac{\sum_{i=1}^{n}(TZ_i - TZ_h)}{n} + TZ_h$$

where $TZ_h$ is the time zone at the host site, $TZ_i$ is the time zone at another participating site, and n is the number of participating sites. Because there may not always be a MCU in the central time zone, the MCU closet to the centrally located time may be selected.

In the example illustrated in FIG. 2, conference sites 230a-230c are located in Bangalore, India; Dallas, Tex.; and San Jose, Calif., respectively. As depicted in FIG. 2, the earth is divided into ninety-six time zones, each representing approximately fifteen minutes of time. The time zone associated with each site are as follows: Bangalore t+22, Dallas t+72, and San Jose t+59. Assume that San Jose is the host site for the conference. According to the above equation, the central time zone is at t+51. Because there is not a MCU positioned at t+51, MCU 240b in time zone t+48 may be selected to host the conference.

In a particular embodiment, a system directory, accessible by a CM, may contain information about the bandwidth or speed of certain telecommunication lines between particular sites. Thus, if there is a high speed communications line between San Jose and Bangalore, then the system may account for the enhanced network capabilities by discounting the time zone distance between the two sites. To illustrate, if a telecommunications line connecting San Jose and Bangalore is able to transport data twice as fast as a line between San Jose and Dallas, then the CM may decrease the time zone difference between San Jose and Bangalore by a factor of two when calculating the central time zone.

It should be noted that while a specific method for determining a central time zone has been described, any method for determining a central time zone between a plurality of sites may be used. For example, a central time zone may be the average time zone of a plurality of sites, a median time zone, or a time zone wherein the cumulative distance (as measured in time zones) between the sites is minimized.

In accordance with another embodiment, a CM may select a centrally located host MCU based on location information associated with each site participating in a conference. In particular, a CM may use latitude and/or longitude coordinates of each site and thereby determine a MCU which is centrally located among the cites. The location information associated with each site and/or MCU may be stored by a CM in a system directory, or may be accessible to the CM through communications with network components. In determining a centrally located MCU, the system may institute any suitable policies for measuring the distances between sites. For example, the system may maintain a particular level of granularity such that instead of using exact coordinates of a site in San Jose, Calif., the system simply uses the coordinates for San Jose, Calif. Providing a level of granularity may allow for the system to implement basic network assumptions such as, for example, that the network latency for communications occurring within San Jose, Calif. is nominal. Once the respective distances between each site are determined, a centrally located MCU may be selected based on a distance minimization algorithm. In a particular embodiment, a distance minimization algorithm may determine the location where the cumulative distance between each participating site and the host MCU is minimized.

FIG. 3 illustrates a communication system 300 in accordance with another embodiment. Communication system 300 includes communication network 320, call managers 350a-350c, MCUs 340a-340b, inactive sites 332 and active sites 334. As illustrated, each call manager 350 services a subset of inactive sites 332 and/or active sites 334. Inactive sites 332 and active sites 324 may be similar to sites 30, however an active site 334 is a participant of the conference, whereas an inactive site 332 is not. In particular embodiments, communication system 300 may include similar components and networks as described with respect to communication systems 10 of FIG. 1.

In the embodiment illustrated in FIG. 3, a host MCU may be selected based on the location of the call manager(s) 350 which service active sites 334. For example, the previously described distance minimization calculation may be performed using the locations of the call managers servicing participating sites as opposed to the participating sites themselves. As with the previous embodiments, certain assumptions may be made with respect to network latency. In particular, this embodiment may assume that the latency for communications occurring below a call manager is nominal. More specifically, it may be assumed that there is only minimal network latency for communications between a particular call manager and the sites which it services.

In a particular embodiment, a certain weight may be assigned to each call manger to accommodate for a call manager that may be servicing more active sites 24 than other call managers. For example, as illustrated in FIG. 3, call manager 350a is servicing two active sites 334, whereas call managers 350b-350c are each servicing a single active site. Therefore, the location of call manager 350a may receive increased priority when selecting the host MCU. The relative weight that is assigned to a particular call manager may be a function of any suitable network policy. Weighting the location of a particular call manager may enable the system to provide better service by selecting a host MCU located where a majority of the data traffic occurs. Accordingly the potential effects of network latency may be limited.

It should be noted that a host MCU may be selected according to any combination of the previously described embodiments and methods. For example, a host MCU may be selected partially based on its location relative to the participating sites and partially based on the latency between the MCU and the sites. In addition, network conditions such as latency and packet loss rate may be tested just prior to initiating a conference to ensure that a previously selected MCU is still the optimal MCU for hosting a conference. If the network conditions just prior to the conference indicate that the MCU previously selected to host a conference is no longer the optimal MCU, another MCU may be assigned to host the conference. Therefore, a conference may be assigned or reassigned to any number of MCUs to ensure that an optimal MCU hosts the conference.

Figure 4:
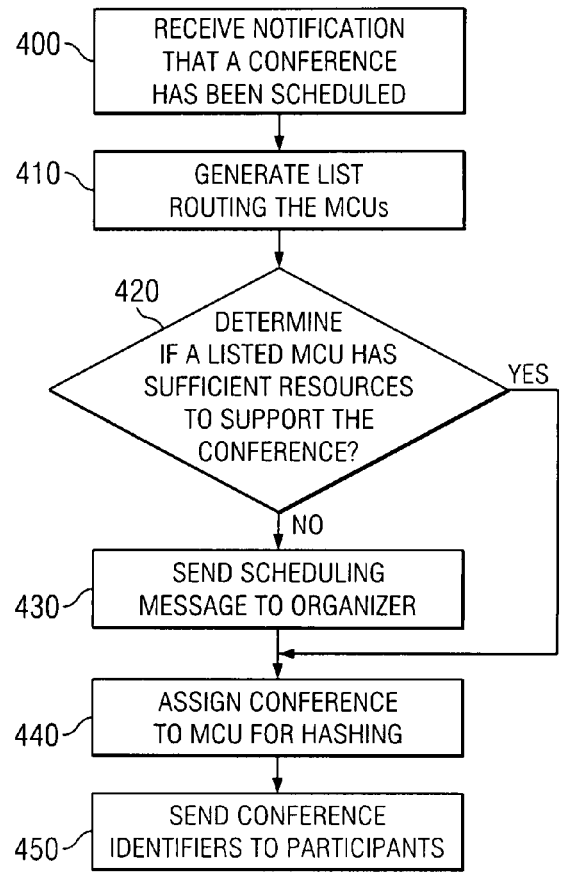
FIG. 4 is a flowchart illustrating a method for identifying a multipoint control unit for hosting a conference in accordance with a particular embodiment.

FIG. 4 is a flowchart illustrating a method for identifying a host MCU 40 in accordance with a particular embodiment. The described process begins at step 400 with a CM 60 receiving a notification that a conference has been scheduled. The conference may be scheduled via any suitable scheduling software or program. The notification may be sent to the CM 60 from a device, such as a computer, personal digital assistant (PDA), phone, etc., which the organizer uses to schedule the conference. Alternatively, the notification may be generated by the organizer scheduling the conference directly at a CM 60. The notification may include conference parameters such as the time of the conference, participant identifications, conference site identifications, or any other information associated with scheduling or hosting a conference.

In response to receiving a notification that a meeting has been scheduled, the CM 60 may, at step 410, generate a list ranking the MCUs. In particular, the MCUs in the network may be ranked based on one or more network conditions. Network conditions may include, for example, the location of a conference site, latency, and availability of network resources such as bandwidth. In a particular embodiment, certain control parameters may be implemented which omit MCUs that fail to meet specified criteria from the list. For instance, if a MCU 40 is located too remotely from the participating sites or if the latency is above a certain threshold, then the MCU 40 may be excluded from the list.

Once a list ranking the MCUs is generated, the CM 60 may determine whether any of the MCUs are capable of hosting the conference at step 420. This determination may be based on whether a MCU has sufficient resources based on the conference parameters (time, number of participants, location of the participants, etc.) to serve as a host. Because a particular MCU 40 may already be scheduled to host one or more other conferences, a particular MCU 40 may not have sufficient resources to support the conference currently being scheduled. Accordingly, the CM 60 may run through the list, starting with the highest ranked MCU, and determine whether a listed MCU 40 has sufficient resources to host the conference. In a particular embodiment, a CM 60 may store information regarding the resources currently available for each MCU 40 in a directory and thereby search the directory to determine whether a MCU 40 has sufficient resources. In an alternate embodiment, the CM 60 may send a request message indicating the resources needed to support the conference to one of more MCUs. In response to receiving the request message, a MCU 40 may determine its resources available and send a reply message. The reply message may indicate that the MCU 40 has sufficient resources to support the conference. Alternatively, the reply message may indicate that the MCU 40 is not able to support the conference and may specify the available resources for the scheduled conference time. Additionally, the reply message may indicate a time when it will have sufficient resources to support the conference. If a MCU 40 has sufficient resources to support the conference, then the CM 60 may assign the conference to the MCU 40 for hosting at step 450.

If none of the listed MCUs have sufficient resources to support the conference, then the CM 60 may prompt the conference organizer with a scheduling message at step 430. The scheduling message may indicate that one or more of the conference parameters needs to be changed. More specifically, the scheduling message may indicate that the user needs to schedule the conference for another time and/or remove certain participants from the conference. In a particular embodiment, the scheduling message may suggest one or more times when the conference may be scheduled. The scheduling message may also indicate that the conference may be scheduled at the requested time, but with limited resources. The organizer may respond to the scheduling message by inputting updated conference selections such as a different time for the conference, or choosing a certain site or participant to remove from the conference. If the organizer elects to change the schedule, the CM 60 may, at step 440, receive a response from the organizer indicating a change in the schedule. In response, the process may return to step 410 wherein a list ranking the MCUs is generated using the new conference parameters.

Once a MCU 40 that has sufficient resources to support the conference is identified, the conference may be assigned to the MCU 40 for hosting at step 440. Assigning the conference to a MCU 40 for hosting may involve reserving any resources necessary to support the conference. Once a host MCU 40 has been identified and assigned to host the conference, the CM 60 may send conference identifies, such as conference codes or access numbers to the participants at step 460.

One skilled in the art will readily recognize that some of the steps illustrated in FIG. 4 may be combined, modified or deleted where appropriate, and additional steps may also be added to the flowchart. Additionally, steps may be performed in any suitable order without departing from the scope of the invention.

Further, while the present invention has been described in detail with reference to particular embodiments, it should be understood that various other changes, substitutions, and alterations may be made hereto without departing from the spirit and scope of the present invention. For example, any of the described embodiments for identifying a MCU for hosting a conference may be combined and/or repeated. Additionally, while certain methods of identifying an optimal MCU have been described as occurring at a certain time, such as prior to a conference or at the time of scheduling, the methods may be performed anytime up to the start of a conference. In particular, current network latency may be measured immediately prior to the start of the conference to determine whether the assigned host MCU is still the optimal MCU for hosting the conference. Further, the disclosed elements and components of the various embodiments contemplate great flexibility in the arrangement of these elements as well as their functions.

Numerous other changes, substitutions, variations, alterations and modifications may be ascertained by those skilled in the art and it is intended that the present invention encompass all such changes, substitutions, variations, alterations and modifications as falling within the spirit and scope of the appended claims.

What is claimed is:

1. A method for identifying a multipoint control unit (MCU) to host a conference, comprising:
   receiving a notification indicating one or more conference parameters;
   ranking a plurality of MCUs, the ranking based on one or more network conditions and a location of each MCU with respect to a plurality of sites participating in the conference;
   selecting a first MCU based on a rank associated with the first MCU;
   determining whether the first MCU is capable of hosting the conference based on the one or more conference parameters; and
   assigning the conference to be hosted by the first MCU in response to determining that the first MCU is capable of hosting the conference, wherein the location of each MCU with respect to a plurality of sites is based on any of a time zone, latitude/longitude, country code/phone number prefix, or an identifying tag associated with each of the plurality of sites participating in the conference.

2. The method of claim 1, further comprising:
   selecting a second MCU based on a rank associated with the second MCU in response to determining that the first MCU is not capable of hosting the conference;
   determining whether the second MCU is capable of hosting the conference; and
   assigning the conference to be hosted by the second MCU in response to determining that the second MCU is capable of hosting the conference.

3. The method of claim 1, wherein the network conditions include network latency.

4. The method of claim 1, wherein the respective locations of the plurality of sites are based on the location of one or more call managers associated with each of the plurality of sites participating in the conference.

5. The method of claim 1, wherein the network conditions include bandwidth.

6. The method of claim 1, further comprising:
estimating network conditions based on a record of network data.

7. The method of claim 1, further comprising:
sending a test ping between site scheduled to participate in the conference and one or more of the plurality of MCUs;
determining network latency based on a response to the test ping; and
ranking the plurality of MCUs in response to the network latency.

8. The method of claim 1, further comprising:
testing the network conditions prior to initiating the conference, wherein testing the network conditions includes sending a test ping between the first MCU and one or more of a plurality of sites scheduled to participate in the conference.

9. The method of claim 1, further comprising:
sending conference identifiers to each of a plurality of sites scheduled to participate in the conference.

10. The method of claim 1, further comprising:
determining that not one of the plurality of MCUs is capable of hosting the conference; and
prompting a user with a scheduling message indicating that one or more of the conference parameters needs to be changed in response to determining that not one of the plurality of MCUs is capable of hosting the conference.

11. A system for identifying a multipoint control unit (MCU) to host a conference comprising:
an interface operable to receive a notification indicating one or more conference parameters; and
a processor operable to:
rank a plurality of MCUs, the ranking based on one or more network conditions and a location of each MCU with respect to a plurality of sites participating in the conference;
select a first MCU based on a rank associated with the first MCU;
determine whether the first MCU is capable of hosting the conference based on the one or more conference parameters; and
assign the conference to be hosted by the first MCU in response to determining that the first MCU is capable of hosting the conference wherein the location of each MCU with respect to a plurality of sites is based on any of a time zone, latitude/longitude, country code/phone number prefix, or an identifying tag associated with each of the plurality of sites participating in the conference.

12. The system of claim 11, wherein the processor is operable to select a second MCU based on a rank associated with the second MCU in response to determining that the first MCU is not capable of hosting the conference;
determine whether the second MCU is capable of hosting the conference; and
assign the conference to be hosted by the second MCU in response to determining that the second MCU is capable of hosting the conference.

13. The system of claim 11, wherein the network conditions include network latency.

14. The system of claim 11, wherein the respective locations of the plurality of sites are based on the location of one or more call managers associated with each of the plurality of sites participating in the conference.

15. The system of claim 11, wherein the network conditions include bandwidth.

16. The system of claim 11, wherein the processor is operable to:
estimate network conditions based on a record of network data.

17. The system of claim 11, wherein the processor is operable to:
send a test ping between each site scheduled to participate in the conference and one or more of the plurality of MCUs;
determine network latency based on a response to the test ping; and
rank the plurality of MCUs in response to the network latency.

18. The system of claim 11, wherein the processor is operable to:
test network conditions prior to initiating the conference, wherein testing the network conditions includes sending a test ping between the first MCU and one or more of a plurality of sites scheduled to participate in the conference.

19. The system of claim 11, wherein the processor is operable to:
send conference identifiers to each of a plurality of sites scheduled to participate in the conference.

20. The system of claim 11, wherein the processor is operable to:
determine that not one of the plurality of MCUs is capable of hosting the conference; and
prompt a user with a scheduling message indicating that one or more of the conference parameters needs to be changed in response to determining that not one of the plurality of MCUs is capable of hosting the conference.

21. A computer readable medium including code for identifying a multipoint control unit (MCU) for hosting a conference, the code operable to:
receive a notification indicating one or more conference parameters;
rank a plurality of MCUs, the ranking based on one or more network conditions and a location of each MCU with respect to a plurality of sites participating in the conference;
select a first MCU based on a rank associated with the first MCU;
determine whether the first MCU is capable of hosting the conference based on the one or more conference parameters; and
assign the conference to be hosted by the first MCU in response to determining that the first MCU is capable of hosting the conference wherein the location of each MCU with respect to a plurality of sites is based on any of a time zone, latitude/longitude, country code/phone number prefix, or an identifying tag associated with each of the plurality of sites participating in the conference.

22. The computer readable medium of claim 21, wherein the code is operable to:
select a second MCU based on a rank associated with the second MCU in response to determining that the first MCU is not capable of hosting the conference;
determine whether the second MCU is capable of hosting the conference; and
assign the conference to be hosted by the second MCU in response to determining that the second MCU is capable of hosting the conference.

23. The computer readable medium of claim 21, wherein the network conditions include network latency.

24. The computer readable medium of claim 21, wherein the respective locations of the plurality of sites are based on the location of one or more call managers associated with each of the plurality of sites participating in the conference.

25. The computer readable medium of claim 21, wherein the network conditions include bandwidth.

26. The computer readable medium of claim 21, wherein the code is operable to:
   estimate network conditions based on a record of network data.

27. The computer readable medium of claim 21, wherein the code is operable to:
   send a test ping between each site scheduled to participate in the conference and one or more of the plurality of MCUs;
   determine network latency based on a response to the test ping; and
   rank the plurality of MCUs in response to the network latency.

28. The computer readable medium of claim 21, wherein the code is operable to:
   test network conditions prior to initiating the conference, wherein testing the network conditions includes sending a test ping between the first MCU and one or more of a plurality of sites scheduled to participate in the conference.

29. The computer readable medium of claim 21, wherein the code is operable to:
   send conference identifiers to each of a plurality of sites scheduled to participate in the conference.

30. The computer readable medium of claim 21, wherein the code is operable to:
   determine that not one of the plurality of MCUs is capable of hosting the conference; and
   prompt a user with a scheduling message indicating that one or more of the conference parameters needs to be changed in response to determining that not one of the plurality of MCUs is capable of hosting the conference.

31. A system for identifying a multipoint control unit (MCU) for hosting a conference comprising:
   means for receiving a notification, the notification indicating one or more conference parameters;
   means for ranking a plurality of MCUs, the ranking based on one or more network conditions and a location of each MCU with respect to a plurality of sites participating in the conference;
   means for selecting a first MCU based on a rank associated with the first MCU;
   means for determining whether the first MCU is capable of hosting the conference based on the one or more conference parameters; and
   means for assigning the conference to be hosted by the first MCU in response to determining that the first MCU is capable of hosting the conference wherein the location of each MCU with respect to a plurality of sites is based on any of a time zone, latitude/longitude, country code/phone number prefix, or an identifying tag associated with each of the plurality of sites participating in the conference.

* * * * *